(12) United States Patent
Eriksén (10) Patent No.: US 9,725,134 B2
(45) Date of Patent: Aug. 8, 2017

(54) SHIP BREAKING DOWN ARRANGEMENT AND METHOD THEREFORE

(71) Applicant: Erik Dogra, Järfälla (SE)

(72) Inventor: Kjell Eriksén, Hägersten (SE)

(73) Assignee: Erik Dogra, Jarfalla (SE)

( * ) Notice: Subject to any disclaimer, the term of this patent is extended or adjusted under 35 U.S.C. 154(b) by 24 days.

(21) Appl. No.: 14/439,214

(22) PCT Filed: Nov. 6, 2013

(86) PCT No.: PCT/SE2013/051305
§ 371 (c)(1),
(2) Date: Apr. 28, 2015

(87) PCT Pub. No.: WO2014/074061
PCT Pub. Date: May 15, 2014

(65) Prior Publication Data
US 2015/0259037 A1    Sep. 17, 2015

(30) Foreign Application Priority Data

Nov. 6, 2012  (SE) ........................ 1251259

(51) Int. Cl.
*B63B 9/00*  (2006.01)
*B63C 1/02*  (2006.01)

(52) U.S. Cl.
CPC .............. *B63B 9/00* (2013.01); *B63C 1/02* (2013.01); *B63B 2009/006* (2013.01); *Y02T 70/80* (2013.01); *Y10T 29/53983* (2015.01)

(58) Field of Classification Search
CPC ............... B63B 9/00; B63C 1/02; B63C 3/06
(Continued)

(56) References Cited

U.S. PATENT DOCUMENTS 1,506 A * 3/1840 Johnson .................. B63B 9/800
                                                    114/47
1,524 A * 3/1840 Gilbert ..................... B32B 9/00
                                                    114/47
(Continued)

FOREIGN PATENT DOCUMENTS

DE        19943693 A1 * 7/2002 ........... B63B 35/003
JP        S58214491        12/1983
(Continued)

OTHER PUBLICATIONS

International Search Report issued in PCT/SE2013/051305, Nov. 3, 2014, pp. 1-4.
(Continued)

*Primary Examiner* — Gregory Adams
(74) *Attorney, Agent, or Firm* — Jeffrey S. Melcher; Manelli Selter PLLC (57) ABSTRACT

A ship breaking down arrangement (1) comprising,—two waterborne platforms (10, 20) having at least one removing means (60) for removing dismantled parts and/or fluids from a ship (40) which shall be broken;—a midsection (30) placed between and connected to said platforms lifting means provided on the platforms for lifting and lowering the ship between said platforms; and—at least one transporting means (90) for receiving and transporting said dismantled parts and/or fluids to a receiving location, wherein breaking down is performed while the ship is still located at sea. The application also relates to a method for breaking down ships.

16 Claims, 6 Drawing Sheets

(58) Field of Classification Search
USPC ....... 114/125, 222, 268, 31, 382, 44, 45, 47, 114/51, 77 R, 79 R; 266/69; 405/3, 4, 7; 414/138.1, 140.8
See application file for complete search history.

(56) References Cited

U.S. PATENT DOCUMENTS

| | | | | |
|---|---|---|---|---|
| 110,564 | A | | 12/1870 | Gowen |
| 126,146 | A | * | 4/1872 | Janicki ............... B63B 9/00 114/47 |
| 256,608 | A | * | 4/1882 | Watts ................. B63C 3/06 114/259 |
| 735,569 | A | * | 8/1903 | Nelssen ............... B63C 1/02 114/45 |
| 1,300,954 | A | | 4/1919 | Gray |
| 3,073,125 | A | * | 1/1963 | Pearlson .............. B63B 9/00 405/3 |
| 3,133,518 | A | * | 5/1964 | Burnett ............... E02B 7/50 114/45 |
| 3,327,670 | A | * | 6/1967 | Burnett ............... B63B 9/00 114/47 |
| 4,051,796 | A | | 10/1977 | Itani |
| 4,111,144 | A | | 9/1978 | Ingvason |
| 4,139,180 | A | * | 2/1979 | Itani ................... B63B 9/00 114/222 |
| 4,615,289 | A | * | 10/1986 | Bloxham .............. B63C 1/06 114/125 |
| 4,729,332 | A | * | 3/1988 | Ohta .................. B63B 21/00 114/218 |
| 5,131,342 | A | * | 7/1992 | Sackett ............... B63C 3/06 114/344 |
| 6,390,732 | B1 | * | 5/2002 | Kristensen ........... E02B 17/021 405/201 |
| 6,877,450 | B2 | * | 4/2005 | Schmidt .............. B63B 1/04 114/61.13 |
| 6,979,149 | B1 | * | 12/2005 | Thompson ............ E02C 5/00 405/3 |
| 7,634,971 | B2 | * | 12/2009 | Lucas ................ B63B 1/08 114/61.15 |
| 2002/0164231 | A1 | * | 11/2002 | Lucas ................ B63B 35/54 414/137.4 |
| 2009/0317212 | A1 | * | 12/2009 | Munson, Jr. ......... B63B 35/44 414/138.1 |
| 2010/0298970 | A1 | * | 11/2010 | Attwater ............. B63C 3/06 700/213 |
| 2011/0135424 | A1 | * | 6/2011 | Amoss, Jr. ........... B65G 67/603 414/137.9 |
| 2011/0146554 | A1 | | 6/2011 | Wright |

FOREIGN PATENT DOCUMENTS

| | | |
|---|---|---|
| WO | 2007081198 | 7/2007 |
| WO | 2010068085 | 6/2010 |
| WO | 2012014868 | 2/2012 |

OTHER PUBLICATIONS

Written Opinion issued in PCT/SE2013/051305, Nov. 3, 2014, pp. 1-12.
European Search Report issued in European Patent Application No. 13853860.8, Jun. 28, 2016, pp. 1-9.
First Office Action issued in Chinese Patent Application No. 201380068842.4, Oct. 9, 2016, pp. 1-6, and partial translation pp. 1-3.

* cited by examiner

SHIP BREAKING DOWN ARRANGEMENT AND METHOD THEREFORE

TECHNICAL FIELD

The present invention relates to a ship breaking down arrangement for according to the preamble of claim 1.

The present invention also relates to a method for breaking down ships according to the preamble of claim 12.

BACKGROUND ART

Worn out ships are broken down in order to salvage and recycle the materials the ship is made up of.

During breaking down of a worn out ship, the ship is normally dragged up onto a beach where it is dismantled and cut into pieces, often by the manual use of cutting torches. Breaking down in this manner in associated with several problems:

Mainly is manual labor used for operating the heavy steel cables that are used for dragging the ship up on to the beach and also for dismantling the ship and further also for transporting the dismantled ship parts. Various types of accidents and personnel injuries are therefore common. A further serious problem is that during breaking of the ship are toxic or environmental hazardous substances, such that particles from cutting torches used to cut the ships metal hull into pieces, released on the beach. These toxic substances are subsequently washed out to sea, where they pollute water and sea bottom. Oil and fuel in the ship could catch fire by particles from the cutting torch operation. Tanks also may explode.

The operations to be handled with by breaking down a worn out ship are inter alia the removal, treatment and disposal of polluted or dangerous materials as asbestos, waste materials and fluids, Polychlorinated Biphenyls (PCBs), bilge and ballast water, oil, fuel and paints, etc.

Furthermore, oil spill in the ship could be recovered. The above described type of breaking down a worn out ship is often situated in locations with poor infrastructure which makes transport of the broken down materials from the beach to recycling facilities difficult. Moreover, there exists sufficient barely no worker protection. Movable cranes are also difficult to use on sandy beaches.

An arrangement for breaking down ships is known from JP 2012025299 which discloses a floating dock having an open section into which a ship to be broken down is introduced. It still remains the disadvantage that the personnel must be lowered down into the open section to dismantle parts and to discharge hazardous fluids.

U.S. Pat. No. 4,111,114 discloses a ship's docking plant for breaking down ships according to the pre-characterising portions of the independent claims. This system requires deep water access alongshore and is limited to its function as it can only handle one ship at a time. The system according to U.S. Pat. No. 4,111,114 cannot be moved because it is anchored to the bottom of the sea. This system needs piles for their lifting system. Furthermore, this system cannot be used offshore. Moreover, it cannot collect all the poisonous and polluted material and toxic particles which can fall down from the ship.

The plant according to U.S. Pat. No. 4,111,114 uses only one big floating platform having two fixed side parts with a recess there between. The submergible portion is accommodated in the recess. Hence, this plant is limited to the width of the recess.

U.S. Pat. No. 4,051,796 discloses a method of breaking up ship hull. This method does not describe how to collect poisonous material. Due to this method, ships are first dismantled from the bow and aft ends and then finally at the middle thereof.

WO 2007/081198 describes an elevated dock which requires a deep water port system, not available in places where the most dismantling takes places today, generally called "beaching". This dock is similar to a dry docking system and needs to be ashore.

OBJECT OF THE INVENTION

Thus, an object of the present invention is to achieve a ship breaking down arrangement and a method for ship breaking down which solves most of the above mentioned problems.

SUMMARY OF THE INVENTION

According to the invention this object is achieved by a ship breaking down arrangement, comprising at least two waterborne platforms each having at least one removing means for removing dismantled parts from a ship that is broken down; a midsection (30) placed between and connected to said at least two waterborne platforms, said midsection having lifting means (130) for lifting the ship between said platforms; and at least a first transporting means for receiving and transporting said dismantled parts and/or fluids to a receiving location, wherein breaking down is performed while the ship is still located at sea.

The inventive ship breaking arrangement provides for effective and environmental friendly breaking, i.e. dismantling, of ships at sea. A ship that shall be broken can be sailed to the location of the breaking platform located, thus breaking can take place basically anywhere. Alternatively, the ship breaking arrangement can be transported, e.g. towed to the location of the ship that shall be broken. Thanks to the removing means, typically cranes, on the floating platform it is possible to lift dismantled parts from the ship that is broken down and place these dismantled parts on transporting means, such as barges. This greatly reduces the need for manual labor. The transporting means can subsequently be sailed to a receiving location that has facilities for recycling the broken down ship parts, e.g. a steel works or a scrap yard and also to ships for export. Thus, there is no demand on infrastructure such as roads at the breaking position.

The arrangement according to the invention is capable to break down three ships simultaneously. One ship can be treated on the port side and one on the starboard side plus one in the middle of the arrangement. The arrangement according to the invention has doors at the end of the middle sinkable platform and closing walls on the sides so that substantially all poisonous and polluted material and toxic particles can be collected.

The toxic particles that results when the hull of the ship is cut into pieces with cutting torches fall down onto the floating platform and can be collected. Therefore, essentially no toxic particles fall into the sea. Also liquid spills will be collected.

The arrangement according to the invention is mobile and is built on a different technique, as it does not require piles. This also means that the arrangement is an offshore solution. The arrangement according to the invention starts breaking down a ship from the top and then downwards of the ship.

In the middle pontoon of the arrangement according to the invention, a submersible pontoon is provided, which lifts the remaining part of the vessel to be finally cut down. In other words, the big part where the dismantling of upper parts of the ship (super structure, etc.) is done beside the side pontoons so that when only the bottom part of the ship remains, the rest of the dismantling process will be finished inside the middle pontoon. The lifting system on this middle pontoon can be adjusted to the suitable situation. The sides and ends of the pontoon are closed with simple gates at this stage so that substantially all the poisonous and polluted material and toxic particles will be collected and will be stored in the tanks of the side pontoons.

When no steel materials are left this pontoon will be cleaned using "vacuum cleaner" to collect all remains for temporary storage in tanks on board side lying pontoons.

To sum up the arrangement and the method according to the invention differs from the prior art systems by:

1. Faster breaking down of ships due to being able to perform it in several stages.
2. Flexibility.
3. Environment friendly, while discharge is prevented and dangerous materials are collected in reservoirs or containers for solid waste matter throughout the whole breaking down process.

The platform between the pontoons consists of several bottom tanks and side tanks which can be filled by pressure from the sea. Many tanks are needed so that the sinking and raising of the middle pontoon can compensate for weight displacements of the broken down ships longitudinally as well as laterally. By emptying the tanks low pressurized air is blown into the tanks which press out the water into the sea (pure ballast water). At a draught of 10 meter the required pressure is only about 1 bar. The method is used among others by submarines at sinking and by "surfacing".

The low pressure compressors for needed pressure are placed in the side walls of the sinkable platform with fixed tubing to the tanks. This is controlled from the pontoons by means of electrically controlled remote valves. Thereby, the cable and hose drawing from the pontoons will be minimal and simple.

The arrangement according to the invention for breaking all types of ships is, in particular advantageous for breaking of very large ships, such as ships with preferably displacements exceeding 1000 TDW.

The arrangement according to the invention can also be used as a floating ship building and repair yard.

Further advantages are obtained by the embodiments and alternatives disclosed in the dependent claims.

DESCRIPTION OF THE DRAWINGS

The invention is described with reference to the accompanying drawings showing a preferred embodiment.

FIG. 4b shows a sectional view along the line IV-IV in FIG. 4a.

FIG. 4c shows a sectional view along the line V-V in FIG. 4a.

DESCRIPTION OF EMBODIMENTS

In the drawings, similar details are denoted with the same reference number.

Figure 1:
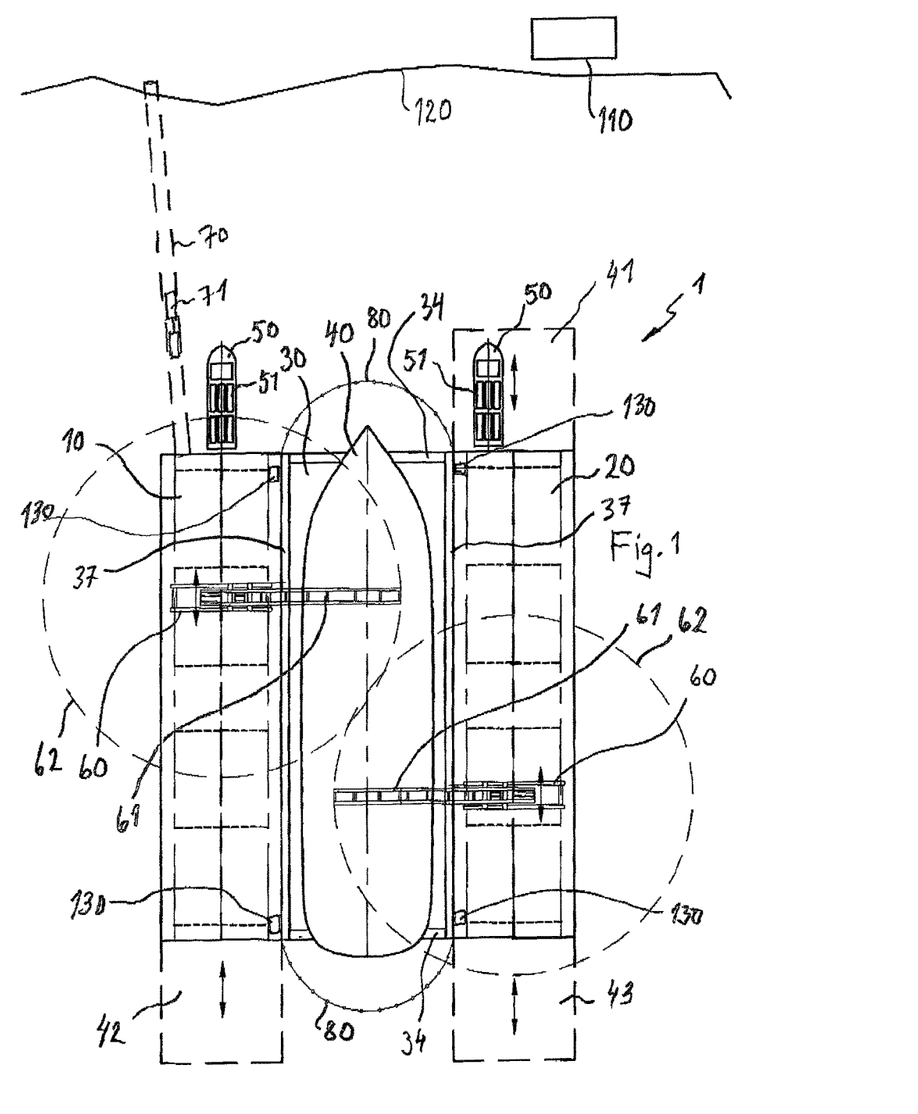
FIG. 1 shows schematically a plan view of a first embodiment of a ship breaking down arrangement according to the invention.

In FIG. 1 a ship breaking down arrangement 1 according to the invention for breaking down or scrapping a worn out ship 40 is shown, typically a big ship such as an oil tanker, a bulk carrier or a passenger ship. By "ship" is herein meant a waterborne vessel, typically a big boat such as an oil tanker or a passenger cruise ship. By "breaking down" is meant a process by which the ship is substantially entirely taken apart or dismantled into individual parts wherein the removed parts are disposed, re-melted or reused as spare parts.

The breaking down arrangement for breaking down a ship, hereafter denominated "breaking down arrangement" comprises a first waterborne platform 10 and a second separate waterborne platform 20 and a substantially plan midsection 30 situated between both side platforms 10, 20. By "waterborne platform" is meant that the platform floats on water and can be transported from one position to another on the surface of the sea either by towing or by own drive means. The waterborne platforms 10, 20 are typically each a pontoon which comprises a substantially flat upper surface, i.e. a platform. The waterborne platforms 10, 20 can be provided with self-contained propulsion means, such as an engine and a propeller. Alternatively, the platforms 10, 20 can be adopted to be towed by another vessel. The waterborne platforms could thus each be any type of suitable vessel, such as a barge or a ship, having an upper substantially flat platform. The dimensions of the waterborne platforms 10, 20 depend on the size of the ships which shall be broken down and the dimensions of the equipment that are provided on the platform. For example, the length of the platforms is at least equal to the length of the long side of the ship that shall be broken down. Preferably, the lengths of the platforms 10, 20 are equal to or longer than the length of the ship that shall be broken down. By designing the length of the platforms as described essentially all particles and liquids generated during breaking down falls onto the platforms and/or the midsection and not into the sea. At least one of the waterborne platforms 10, 20 is secured, e.g. anchored to the sea bottom, in a position where the water is deep enough for the ship that shall be broken down. Obviously the platforms are anchored in a manner such that they follow the tidal water levels and local current.

The waterborne platforms 10, 20 carries each various types of equipment used for dismantling the ship 40. Such equipment includes at least one removing means 60 for removing dismantled parts from the ship 40. The removing means 60 is typically a crane arranged on each waterborne platform 10, 20. The removing means 60 can also comprise equipments like cutting torches to cut the ship into parts. In the embodiment of FIG. 1 two cranes 60 are shown. The cranes 60 have each a crane boom 61 which all together reaches over the ship 40. Each crane 60 comprises in a known manner steel wires, winches and hooks or other type of gripping equipment, so that dismantled parts and/or fluids can be lifted and transported from the ship. The cranes are preferably arranged such that they can move along the long side of the waterborne platforms. The cranes are further arranged so that the boom can be swung in a circle 62 around the crane 60, as indicated by the dashed lines in FIG. 1. In particular the cranes 60 are arranged such that they can reach objects such as dismantled parts and/or fluids on the ship and so that they can reach transport means 50 (which will be further described below) in order to place the dismantled parts and/or fluids on the transport means 50. It is obvious that several cranes 60 can be arranged on each platform 10, 20. The cranes 60 will be arranged to move longitudinally of the platforms 10, 20 and should have a lifting capacity of 40 tons or more.

The waterborne platforms 10, 20 can further carry pulling means (not shown) for pulling the ship 40 into close contact with one or both of the waterborne platforms 10, 20 and holding means (not shown) for holding the ship in this position. The pulling means are for example several automatic pulling winches that are arranged along the long side of each platform. In operation the steel wires of the pulling winches are attached to the long side of the ship 40 which shall be broken down. The ship is then pulled by the winches until the ship is in physically in contact with the long side of the platform 10 or 20. The winches automatically tensions and releases the pulling force so that the ship and platforms maintain in close contact as ship and platform moves with the waves. The close contact between the waterborne platforms and the ship has the effect that particles that are generated by cutting torches used for cutting the ship into pieces are collected on the platform 10, 20. During breaking down of ships cutting torches are often used for cutting the ship into pieces that subsequently can be handled separate. The use of cutting torches generates particles such as droplets of molten metal or particles that are generated by reaction between the hot gases of the cutting torch and alloy elements in the metal or chemicals, such as paint, on the metal. These particles are often toxic to the environment and to personnel and ruin the sea bottom or poison sea life if released into the water. In the early part of the dismantling process, special equipment will be used to remove most of the paints on the ship.

A main advantage of the ship breaking down arrangement according to the invention is that such particles are collected on the platforms or the midsection 30 during breaking down of a ship. The particles can thereafter be loaded onto transport means and transported to a recycling facility where hazardous rest product can be professionally handled, either for reuse or acceptable disposal. Of course during breaking down, some particles fall on, or in, the ship that is dismantled. These particles are also collected and transported away. The particles may for instance be collected by dust sucking equipment, e.g. vacuum cleaners. Particles can also be processed on board.

Figure 2:
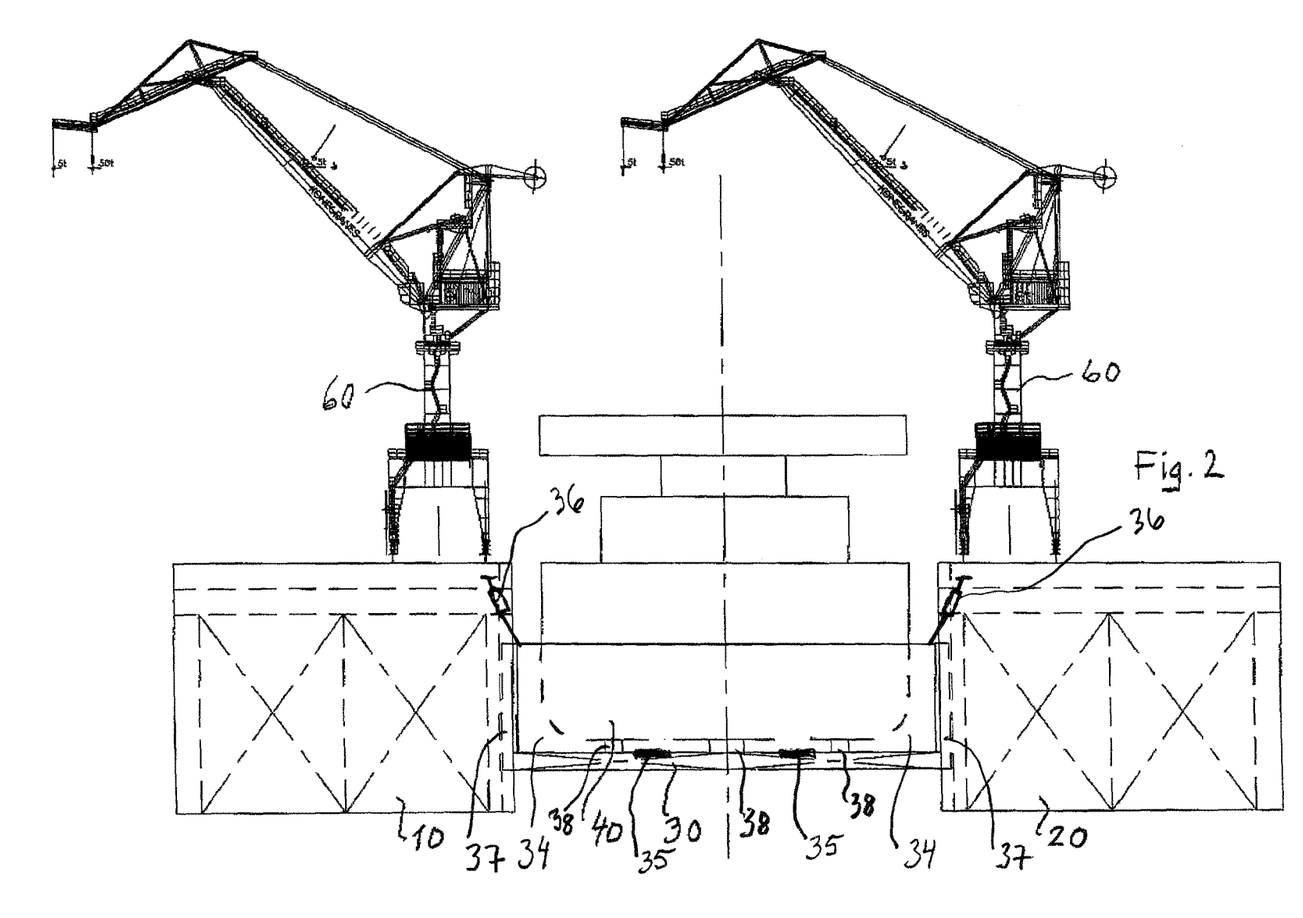
FIG. 2 shows an end view of the ship breaking down arrangement in FIG. 1.

The waterborne platforms 10, 20 could also carry other equipment, such as ballast pumps, generators for generating electrical power, workshops or crew accommodations (these items are not shown in FIGS. 1 and 2).

The ship breaking down arrangement 1 further comprises transport vessels 50 provided for receiving the broken down or dismantled parts and/or fluids and to transport the broken down parts from the waterborne platforms 10, 20 to a receiving location 110 at the shore 120. The transport means 50 could for example be one or several shuttle boats, or barges or any type of waterborne vessel onto which dismantled parts can be loaded. According to an alternative, the waterborne transport vessel could carry truck trailers or railway wagons 51. The dismantled parts may then be directly loaded by the cranes 60 onto the trailers or wagons. After loading, the transport vessels 50 are sailed to the receiving location 110, typically a port where a recycling facility, such as a scrap yard, a steel works, or a metal melting facility is located. If the dismantled parts are loaded onto trailers or wagons on the transport means 50, the dismantled parts could directly be transported further away from the receiving location by road or railway without time consuming reloading.

According to an alternative, the ship breaking down arrangement 1 according to the invention could comprise a bridge 70, such as a pontoon bridge that connects the waterborne platform 10 with a shore line 120. In this case, dismounted parts and/or fluids could be loaded onto transport means 71 which in this case is a truck with a trailer and be transported directly by truck from the waterborne platform 10 or 20 to the receiving position 110. This alternative has the advantage that dismounted parts and/or fluids can be brought ashore very fast. Of course, the possibility also remains that the platforms are tied directly with a quay.

The ship breaking down arrangement 1 according to the invention could also comprise an oil boom 80 placed around the ship or only at the ends thereof, as shown in FIG. 1, in order to collect oil that leaks from the ship 40.

Both waterborne platforms 10, 20 could comprise almost equal equipment, in particular pulling winches and cranes, and need therefore not to be described more in detail. In operation, the ship and the platforms 10 are positioned alongside each other and opposite each other with regard to the ship 40. The platforms 10, 20 are pulled in close contact with the ship 40 by means of pulling winches which are arranged on both platforms 10, 20. Subsequently, at least one of the platforms 10, 20 can be anchored to the sea bottom. The provision of two waterborne platforms provides for more effective breaking down, since the rate by which dismantled parts and/or fluids are removed from the ship is doubled. Also, the transport capacity is increased, since there is room from more transporting vessels 50. Moreover, the stability of the ship 40 is increased by two waterborne platforms 10, 20 and essentially no toxic particles can fall into the sea since substantially the whole ship is surrounded by platforms onto which the particles could fall. If any particle falls between the ship and one of the platforms, it will be caught up by the midsection under the ship.

Figure 3:
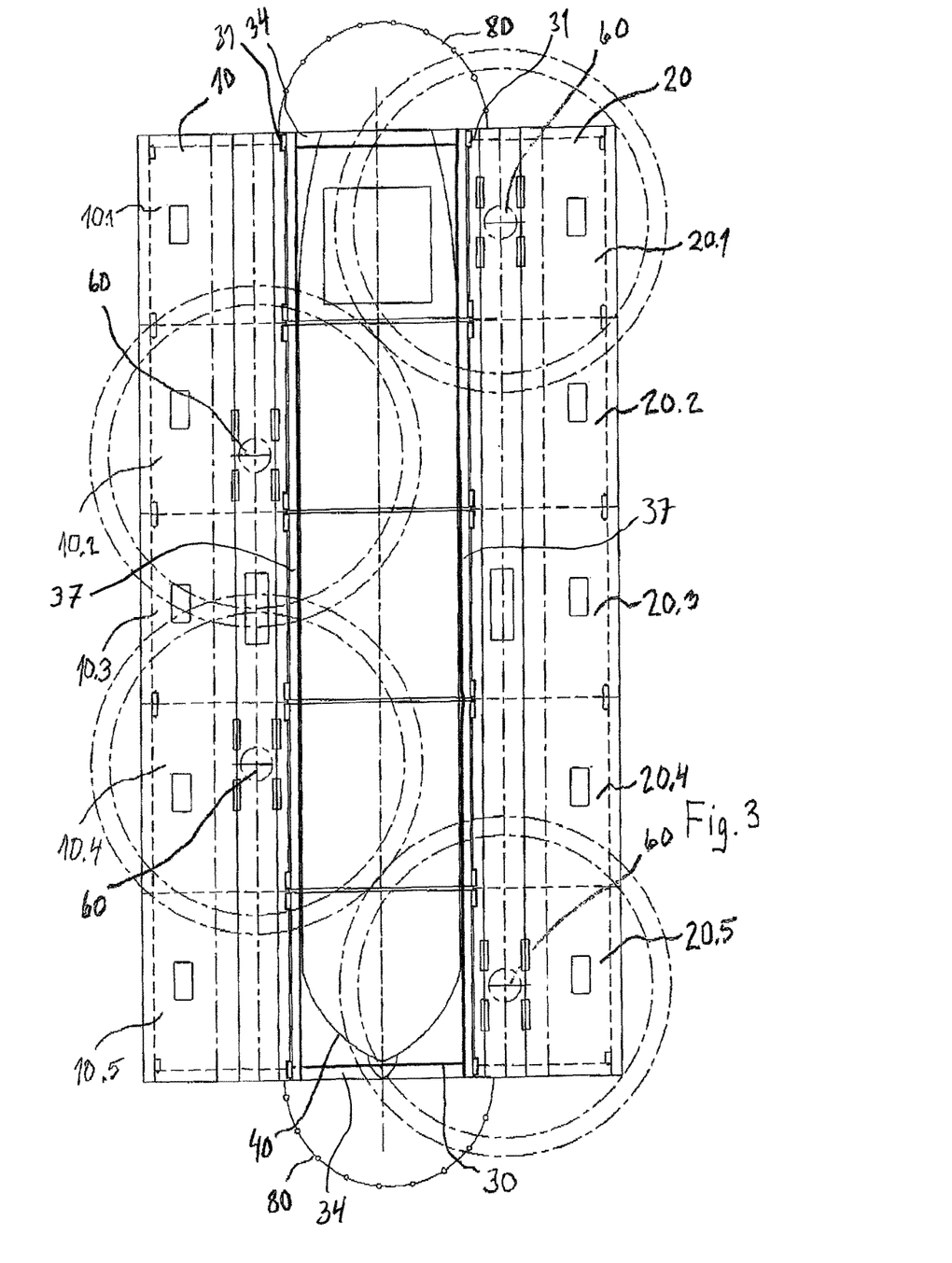
FIG. 3 shows schematically a plan view of a second embodiment of a ship breaking down arrangement according to the invention.
Figure 4A:
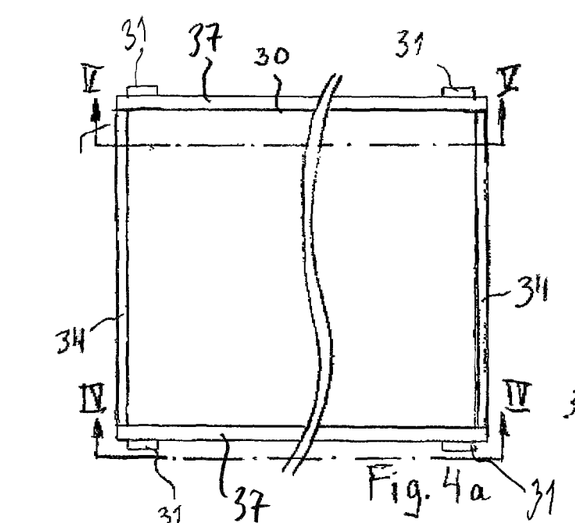
FIG. 4a shows a plan view of a midsection of the ship breaking down arrangement according to the invention.
Figure 4B:
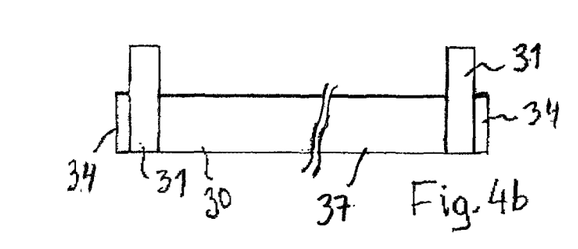
Figure 4C:
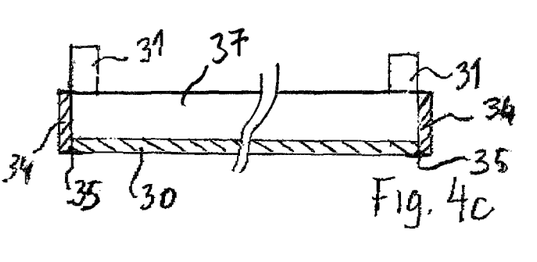
Figure 5:
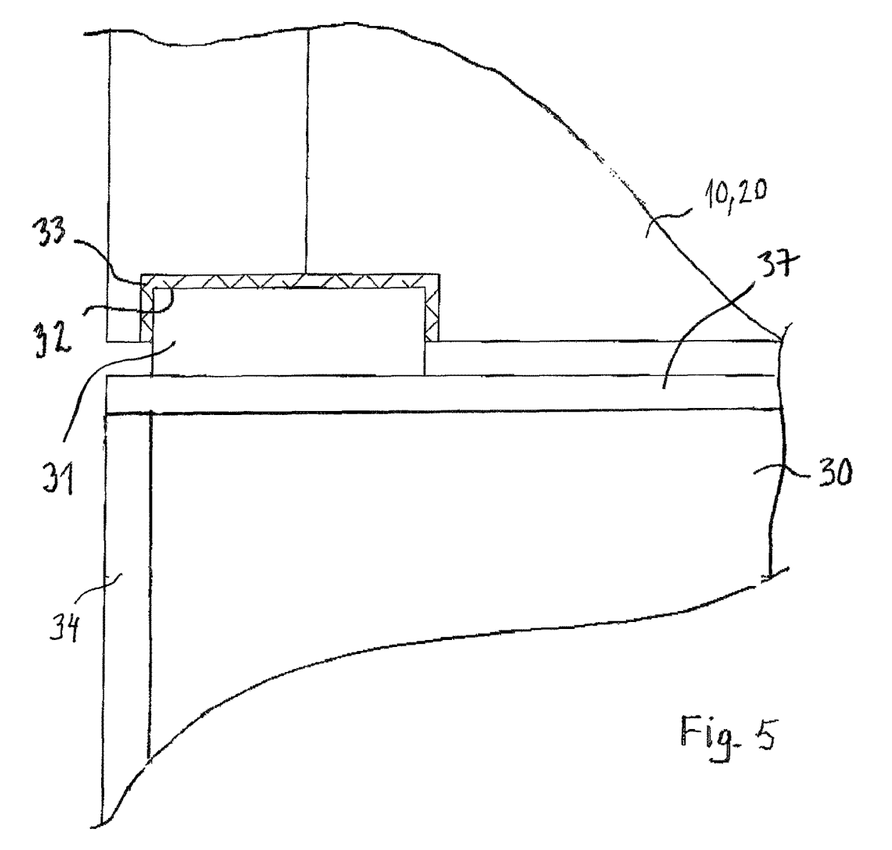
FIG. 5 shows schematically a view in greater scale of a connection between the midsection and one of the side sections of a ship breaking down arrangement according to the invention.

In FIG. 3 an alternative embodiment of the ship breaking down arrangement 1 according to the invention is shown comprising two waterborne platforms which are provided each with two cranes 60 to cover large-sized ships 40. In FIG. 3 it is also evident that the platforms 10, 20 are built up by means of a selected number of modules as 10.1, 10.2, 10.3, 10.4 10.5; 20.1, 20.2, 20.3, 20.4, 20.5. The modules can each be provided with different equipment as well as crew compartments. In FIG. 1, the extension of modules is shown broken lines at 41, 42 and 43.

During breaking down of a ship, the total weight of the ship is reduced. This has the effect that the lower part i.e. the hull and the keel of the ship raises out of the sea.

However, in order to dismantle the lowermost parts of the ship, e.g. the keel and the parts of the hull closest to the keel, the ship must be lifted out of the water so that these parts can be reached. Therefore, the ship breaking down arrangement 1 according to the invention comprises lifting means 130 for lifting the ship out of the water (see FIG. 2). The ship lifting means consists of the midsection 30 which can be raised and lowered by means of lifting devices 130 mounted on the platforms 10, 20. In FIG. 1 only four lifting devices are shown, but the number of lifting device can be altered to any apt number thereof. The midsection 30 is designed such that it can be placed under the keel of the ship or rather the rest of the ship will be placed on top of the lifting midsection 30. Thereby, the platforms 10, 20 can be moved close to the ship 40 to be broken down.

When lifting the midsection 30, it is moved along the platform sides and projections 31 on the midsection 30 are introduced into substantially vertical bearing tracks 32 coated by a slide bearing layer 33 (see FIGS. 4*a*, 4*b*, 4*c* and 5). When the platform is raised the projections 31 are guided by guide means (not shown) into the bearing tracks 32 and thereby the midsection 30 is/can be raised upwards. When lowering the midsection 30 the projections 31 leaves the bearing tracks 32 and the midsection 30 is placed under the keels of the platforms 10, 20. Lowering of this midsection will take place, e.g. by filling the midsection with water (will be described more in detail below). Removing the water from the midsection 30 will lift the remains of the ship for final scrapping. At the ends of the midsection 30 foldable end wall sections 34 are connected to the midsection by means of hinge joints 35. By means of hydraulic devices 36 or the like power devices, the end wall sections 34, preferably on both ends of the midsection 30, can be folded downwards to make it possible to enter a new ship 40 which shall be broken down. Longitudinal side wall sections 37 are provided on the longitudinal sides of the midsection 30 so that when the end wall sections are folded up to and fixed in an upright position the midsection 30 forms a trough which can collect all the poisonous and polluted material and toxic particles which can fall down from the ship. The ship 40 is shown by broken lines behind the foldable end wall sections 34. Distance pieces 38 are arranged on the midsection 40 for access by final scraping of the hull of the ship 40. When the ship 40 which shall be broken down is lead into the ship breaking down arrangement 1 the end wall section 34 is folded down until the ship is completely inside and above the midsection 40. Thereafter, the wall section 34 is folded back by means of the hydraulic devices 36 to its upright position and secured by means of securing means (not shown).

The lifting devices 130 are preferably several heavy duty winches arranged on each one of the two platforms 10, 20. Steel cables are pulled from a first heavy duty winch on a first platform to the midsection 40 where it is fastened. An opposite heavy duty winch on the other platform is fastened at the other side of the midsection 40. This is repeated along the sides of both platforms. By actuation of the winches on both platforms midsection together with the remaining hull of the broken down ship is lifted out of the water so that the remainder of the ship can be dismantled. This method of lifting the ship is particular advantageous if the arrangement for breaking down of ships is used for breaking down ships of essentially the same width. Besides winches, other lifting devices could be used, such as lifting jacks, jack screws or other known lifting devices.

According to another alternative embodiment, the midsection 40 for lifting the ship out of the water is an automatically lifting platform. This midsection 30 comprises tanks which can be filled by water for lowering the platform into the sea so that the lifting platform can be positioned under the ship. For raising the platform the tanks of the lifting midsection 30 are filled with air whereby the midsection 30 raises and lifts the ship 40 so that the lower most parts of the ship can be reached and dismantled. This alternative is advantageous when the ship breaking down arrangement 1 is used for breaking down ships of different width.

At yet another embodiment, the midsection is replaced by a flexible platform or cloth and several wires extends from a winch on one of the platforms 10, 20, downwards under the ship 40 to be broken down and upwards to a winch on the other platform 10, 20. With this arrangement, the platforms can be brought close to the ship 40 and the flexible platform or cloth is able to catch up objects or fluids falling down from the ship when scrapping.

Hence, the lifting of the remaining parts of the broken down ship 40 takes place on the lifted midsection 30. This will take place in both ends of the midsection 30 to make sure that the lifting operation will take place while keeping the deck of the midsection parallel with the waterborne platforms 10, 20.

After the cleaning of the deck of the midsection 30, it will be lowered into the water, e.g. by emptying the air vents on the tanks.

According to another embodiment, the ship breaking down arrangement 1 comprises a third platform (not shown) that is essentially identical to the platforms 10, 20 described above. The third platform comprises means for removing material that can be reused from the ship 40 that is broken down, for example furniture, kitchen appliances, motors or electronic equipment. For example workers are present on the third platform and removes reusable items from the ship 40. These parts are placed on transport means and are moved ashore. The third platform also comprises means for removing hazardous substances from the ship. These substances could include health or environmentally hazardous chemicals, asbestos, oil or petrol. These substances are also brought ashore.

In operation, the ship that is to be broken is first towed to the third platform and is secured to the platform. The reusable items and the hazardous substances are then removed from the ship. Thereafter, the ship, which is now liberated from poisonous substances, is towed to the first platform as described under the first described preferred embodiment. Optionally, as described under another embodiment a second platform is placed alongside the ship. Hence, two ships 40 to be broken down may simultaneously be attached to the third platform.

Figure 6:
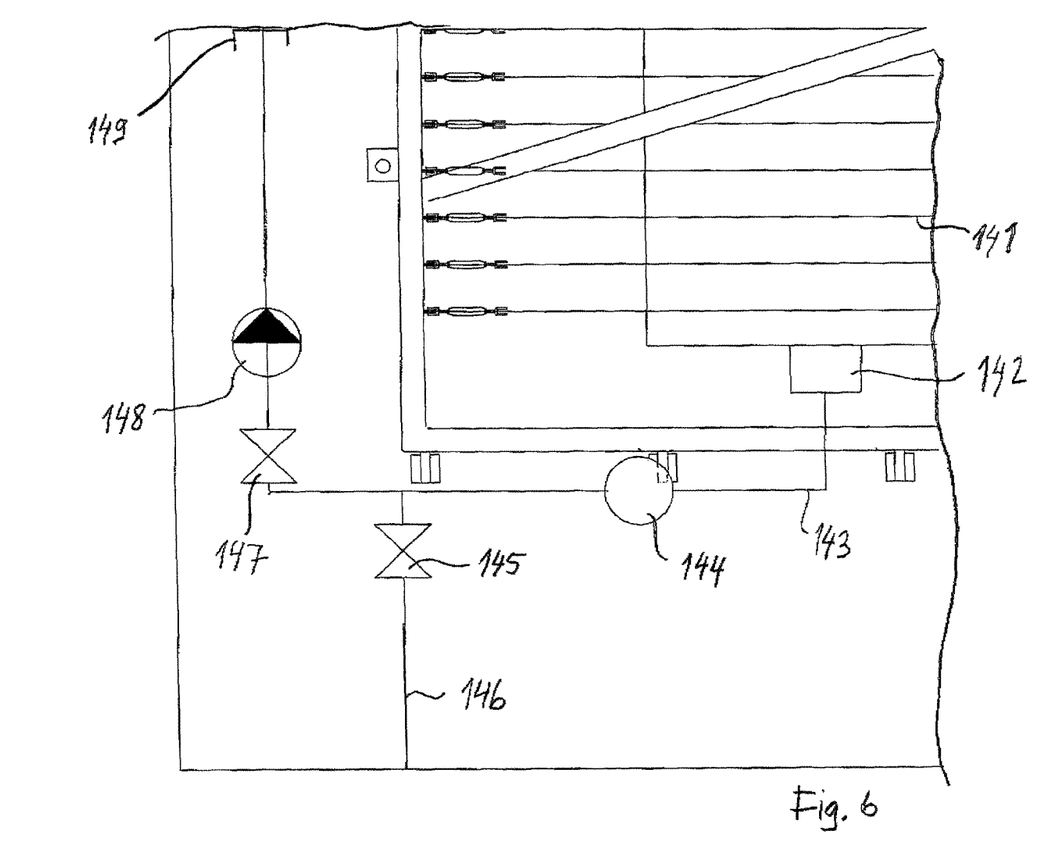
FIG. 6 shows schematically a view in greater scale of an oil detecting and removing device at the ship breaking down arrangement according to the invention.

In FIG. 6, an effective system for taking care of polluted water is shown. Water from the ship 40 is fed to at least one container 141 in the platforms 10, 20 and is fed to a collecting tank 142. Thereafter, the water is run from the collecting device through at least one line 143 to an oil detection monitor 144. If the water running through the monitor 144 is not polluted, a valve 145 in an outlet line 146 is opened and the non-polluted water flows back in the sea. If, on the contrary the monitor 144 finds that the water is polluted a valve 147 is opened and a pump 148 is actuated, whereby the polluted water is transported to a collector tank 149.

The invention also relates to a method for breaking ships.

In a first step, a ship that shall be broken down is transported to the location of the ship breaking arrangement 1 described above. Alternatively, the ship breaking arrangement 1 is transported to a position where the ship that shall be broken down is located.

In a second step, the ship that shall be broken down is positioned according to the invention between two waterborne platforms 10, 20 and a midsection 30 connected to both waterborne platforms is placed under the ship which is to be broken down. The ship is accordingly positioned such that the long sides of the ship are positioned along the long sides of the platforms 10, 20 and over the midsection 40.

Alternatively, the ship is first brought to the third platform for removing hazardous substances and reusable items and thereafter brought to the platforms 10. 20.

In a subsequent the ship and the platform are preferably pulled together in close contact by pulling means, e.g. automatic pulling winches.

In next step, the ship is broken down. This is normally performed by personnel present on the ship. The personnel manually remove parts from the ship and cut the ship in pieces with cutting torches or other cutting equipment.

Thereafter, the dismantled parts are removed from the ship by use of removing means 60, such as cranes 60. The removing means could of course also be used to directly dismantle the ship, e.g. to tear off, or break away parts. The removing means 60 could also be used to assist the personnel in e.g. holding or supporting parts that the personnel are cutting away with cutting torches.

Then, the dismantled parts and/or fluids are placed on transport means 90. Alternatively, the dismantled parts and/or fluids are first placed on either one of the platforms and in a subsequent step the dismantled parts and/or fluids are placed onto the transport means.

Finally, the transport means are moved to a receiving location, such as a port or a recycling facility where the dismantled parts and/or fluids are unloaded or transported further. The transport means thereafter return to the platform for receiving another load. All remains can be cleaned on board and later transported to the shore and/or exported.

In the inventive method it is obvious that some steps can be performed simultaneously.

Still another advantage with the arrangement according to the invention is that the arrangement consisting of two platforms and one midsection can be towed either separately or connected in a row after each other to another site which makes the arrangement flexible. One or both platforms can be provided with drive means to be able to be transported by itself to another site. In this case the midsection must be towed by one of the platforms. The midsection can be made floating by pressing out water from the ballast tanks therein.

The ship breaking down arrangement according to the invention can naturally be modified further within the scope of the description and the attached claims.

The invention claimed is:

1. A ship breaking down arrangement comprising:
   at least two waterborne platforms each having at least one removing device for removing dismantled parts and/or fluids from a ship that is to be broken down;
   a midsection placed between and connectable to said two waterborne platforms, said midsection is constructed to lift and lower the ship placed thereupon between said platforms by means of lifting means provided on the platform, the waterborne platforms and midsection being separable so that each waterborne platform and the midsection can be separately towed to a desired site;
   longitudinal side wall sections provided on longitudinal sides of the midsection and movable end wall sections provided on ends of the midsection so that when the end walls are fixed in an upright position the midsection forms a trough that can collect and contain poisonous or polluted material and toxic particles that can fall down from the ship when the ship is in the midsection; and
   at least one transporting means for receiving and transporting said dismantled parts and/or fluids to a receiving location, wherein breaking down can be performed while the ship is still located at sea.

2. The ship breaking arrangement according to claim 1, wherein said side walls are connected to the midsection and directed upwards and said end walls are directed upwards and connectable to the side walls and are provided with hinge joints on the side abutting the platform to tilt said end walls downwards.

3. The ship breaking arrangement according to claim 1, wherein said at least one removing device comprises one or more cranes for lifting dismantled parts from a ship that is to be broken down.

4. The ship breaking arrangement according to claim 1, further comprising a third waterborne platform having means for removing dismantled parts and/or fluids from the ship that is to be broken down.

5. The ship breaking arrangement according to claim 1, wherein the transporting means includes one or more waterborne vessels.

6. The ship breaking arrangement according to claim 1, wherein the transporting means includes one or more barges.

7. The ship breaking arrangement according to claim 5, wherein each waterborne vessel carries trailers for trucks or train wagons for receiving the dismantled parts and/or fluids.

8. The ship breaking arrangement according to claim 1, wherein said lifting means is constructed to lift said ship on the midsection so that essentially the whole ship can be broken down.

9. The ship breaking arrangement according to claim 1, wherein said midsection can be sized by moving the platforms in relation to each other.

10. A method for breaking down a ship at a ship breaking arrangement according to claim 1, comprising the steps of:
    positioning a ship in contact with the two separate waterborne platforms and the midsection connected to said two waterborne platforms to be lifted or lowered therebetween;
    lifting the end wall sections so that the end wall sections and longitudinal side wall sections to form the trough and using the trough to collect and contain poisonous or polluted material and toxic particles falling down from the ship when the ship is in the midsection;
    dismantling the ship;
    transferring dismantled parts and/or fluids to transporting means; and
    moving said transporting means to a receiving location, wherein breaking down is performed while the ship is still located at sea.

11. The method according to claim 10, wherein the dismantled parts and/or fluids are first placed on one of the at least two platforms and in a subsequent step are transferred to the transporting means.

12. The method according to claim 10, wherein the platforms are positioned in contact with opposite long sides of the ship.

13. The method according to claim 10, wherein the ship and the platforms are pulled into contact with each other and secured.

14. The method according to claim 10, wherein the ship is lifted during dismantling so that substantially the whole ship is broken down.

15. The method according to claim 10, further comprising positioning the ship in contact with a third platform having means for removing reusable items and/or hazardous substances from the ship.

16. The method according to claim 10, further comprising collecting units to be reused for ship building or repair, said step including collecting all poisonous materials for reuse purposes.

* * * * *